United States Patent Office 3,652,490
Patented Mar. 28, 1972

3,652,490
SURFACE COATING COMPOSITIONS AND
ARTICLES COATED THEREWITH
Morgan E. Gager, 16 Skyline Drive,
South Hadley, Mass. 01075
No Drawing. Filed Apr. 6, 1970, Ser. No. 23,084
Int. Cl. B44d 3/18; C08g 41/04, 51/04
U.S. Cl. 260—41 A                               2 Claims

ABSTRACT OF THE DISCLOSURE

Polyurea coated papers or boards or cloths or films or metal sheets serving as substrates or bases or surfaces for artists' paints or color preparations are produced by the application of a polyurea polymer coating composition having free polyisocyanate groups to the substrate and the curing of the so coated substrate.

---

The invention relates to the art of coated papers or boards or cloths or films or metal sheets and particularly concerns a paper or board having a specially prepared surface useful to artists because of the improved retention thereby of the materials found in oil or water or like artist's paints.

The invention identifies novel compositions which are useful for the preparation of certain polyurea resins, a method for preparing these compositions and the coating products therefrom, and novel products obtained from these compositions and having particular usefulness to artists having a need for improved artist's substrates.

The direction improvements in the art of artist's supplies have thus far taken the route of improvements in the artist's paints rather than toward improvements in the substrates upon which same are employed.

The painting with oils, water colors, tempera, and the like, on conventional substrates, dictates careful preparation of the board with special adhesives and fillers, making the material unusually expensive and, worse, not generally available.

Artist's boards and papers, canvas boards, cloths, films and metal sheets, as conventionally used by artists, each suffer in varying degrees from the disadvantages that: they are subject to dimensional change under varying conditions of relative humidity so as to cause the oil paint to crack; they permit the paint to separate from the substrate when soaked in water; they soak up excessive amounts of the paint being applied in the filling of the pores of the substrate, even where such substrate has been previously primed.

Various factors involving substrates have their effect on the painting applied thereto.

A change in relative humidity may change the dimensions of the substrate. If that change is not the same as the change in the paint layer dimensions, the paint cracks.

Another aggravating factor involves the chemistry with respect to water reacting with sulfur dioxide in the air so as to form sulfurous acid which may degrade the substrate constituents.

Another major difficulty generally inherent in artist's substrates is that they allow no control over the surface to be worked.

The present invention overcomes these and other difficulties and disadvantages inherent in prior art substrates for painting purposes.

It envisions a sheet, formed from paper or board or cloth or film or metal and functioning as a substrate, upon which a film or coating is permanently fixed upon one or both surfaces, or upon all surfaces in an encapsulating manner.

The coated planar surface then may serve as the base for a painting made from oil paints, water colors or the like.

The primary purpose hereof is to so condition the substrate as to offer the artist unusual powers of adhesion whereby the paint will adhere to the substrate in a more tenacious manner than has heretofore been realizable.

Another object is to provide a coating with an integral chemical bond to and in the substrate wherefore the product is chemically resistant because of a curing reaction inherent in the preparation process.

Another object is to give the substrate dimensional stability under various conditions of humidity.

Another object is to give the substrate coating continuity even when it is cycled under extreme temperature and humidity conditions.

These and other objects of the invention will be apparent from the following description.

It is known that most polyisocyanates react to produce polyureas. I have fortuitously discovered the novelty in preparing a coated artist's substrate by the application thereto of a polyurea coating composition by reacting an amine with a long chain aliphatic diisocyanate, the reaction product forming a polyurea polymer suitable as a coating applied to a paper or board or cloth or film or metal substrate.

Formulations have been developed within the following range of components:

|  | Range |
|---|---|
| Aliphatic amine (45% solids) | 27.0–40.0 |
| Copolymer of vinyl toluene and methyl styrene (50% solids) | 3.0–17.6 |
| Diatomaceous silica | 15.0–44.0 |
| Titanium dioxide | 2.3–6.6 |
| Aliphatic polyisocyanate (65% solids) | 27.0–40.0 |

An amine bearing compound, such as a ketimine (i.e. a ketone blocked amine) with an average of functionality of 4 and shown graphically below, has been found to be most suitable for the invention:

(2) 

To the amine, a copolymer of vinyl toluene and alpha methyl styrene is added.

This additive is completely saturated and while it has an aromatic ring structure it is soluble in aliphatic solvents. It is sourced by Pennsylvania Industrial Chemical Corporation under the trade name "Piccotex."

It is an unusually clear, glass-like synthetic resin which is both hard and friable in its solid state and exhibits excellent resistance to discoloration or yellowing caused by oxidation or heat. It is also highly resistant to moisture, acid and alkalis.

Water-white color and non-reactivity are the outstanding features of this resin and in the compositions hereof, it has been observed to augment the adhesive qualities and to improve drastically the solvent release from the final coatings obtained.

To the mixture of the amine and the copolymer of vinyl toluene and alpha methyl styrene, a diatomaceous silica, sourced by Johns-Manville under the trade name of "Super-Fine Super Floss," is added, an easily dispersed white diatomite flatting agent.

Chemical inertness and unique diatomite structure combine to provide an easily used extender for rich, uniform flatting effects.

Same has been found useful in improving the wetting properties of the formulations hereof.

To this resultant mixture, a pigment in the form of titanium dioxide is then added, same being sourced by Titanium Pigment Corporation under the trade name "Titanox CL."

This product is a rutile titanium dioxide pigment made by the chloride process and is unique in the totality of properties it possesses. It is characterized by its superior gloss, gloss-retention, and dispersibility. It offers maximum tinting strength, exceptional color, and a high degree of hiding power and brightness.

Magnesium and aluminum silicates, calcium carbonate, barium sulfate, zinc oxide, zinc sulfide, antimony oxide, and bismuth oxide may also be used as pigments.

To the above resultant mixture, a liquid aliphatic diisocyanate is lastly added as the reactant. Other isocyanates may be used as long as the equivalent weight is approximately equal to the equivalent weight of the amine.

The liquid aliphatic diisocyanate is derived from a dimeric fatty acid which results from a controlled polymerization of 18-carbon atoms leading to an aliphatic dibasic acid containing 36-carbon atoms.

The structure of such diisocyanate is denoted by:

$$O=C=N-(D)-N=C=O$$

where D is a 36-carbon hydrocarbon radical.

The long chain aliphatic diisocyanate so obtained, having a controllable rate of reactivity and an exceedingly low rate of reactivity with water, reacts with compounds containing active hydrogen atoms to form monomeric derivatives or polymers. Ideally, it reacts with amino bearing compounds to form polyurea polymers.

Chemically, the reaction product may be shown as:

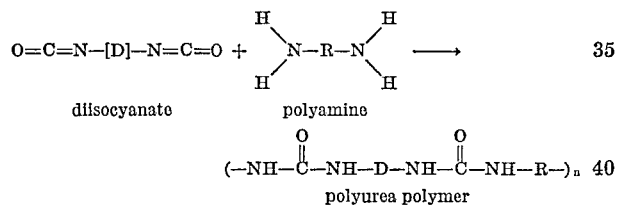

Optimum results have been obtained with a formulation as follows:

| | Parts by weight |
|---|---|
| Aliphatic amine (45% solids in mineral spirits) | 33.65 |
| Copolymer of vinyltoluene and alpha methyl styrene (50% solids in toluene) | 7.40 |
| Diatomaceous silica | 21.50 |
| Titanium dioxide | 3.80 |
| Aliphatic polyisocyanate (65% solids in mineral spirits) | 33.65 |

The mixture is applied as by a brush or spray or roller coating or otherwise to the substrate to be conditioned. The coating serves as a primer to the substrate, resulting in a tight bonding of the formulation to the substrate in manner to become in effect an integrated part thereof.

The more porous the substrate, the rougher the coating suggesting that the pores receive the dissolved polymer and the pigment remains on the tops of the hills and ridges.

The applied coating dries and cures rapidly. A one mil coating is tack-free in thirty seconds or less and a five mil coating can be handled without damage in about four or five minutes at 250° F. and 100% relative humidity. This is a surprising and valuable feature of the invention since the same coating compositions applied to cold substrates in the conventional manner require about one-half hour or more to become tack-free for a one mil coating and about 2 hours or more for a five mil coating. The coatings also possess excellent adhesion, durability, and resistance to abrasion or impact and to chemicals or solvents, or water.

The dried coated substrate sheet may now be used as the base for a painting in oils, water colors or the like.

If an oil paint is used, the painting may be varnished after the paint has dried.

If the textured sheet is to be used for water colors, casein paints and the like, a coating of gum arabic may be applied to the textured sheet to serve as a base for the water color or paint, if the preparation is pigmented, the gum arabic addition is not necessary.

Tests have indicated that when the product is used as a coating on substrates, unusual features of toughness rarely found in coatings make the product ideal as a coating for artists' paper and board. As to the toughness characteristic, free films show extensibilities up to 100–150% and tensile strengths of 2000–3000 p.s.i.

Additionally, it offers outstanding durability, gloss retention and non-yellowing characteristics under aging.

The so-coated substrate has a manifest advantage in that the finished painting will not chip, crack or buckle. It is durable and substantially permanent in nature. When a painting in oils is made on a sheet prepared in accordance with the invention, it will be found to have superior transparency and brilliance as compared with a comparable painting on canvas.

Outstanding transparency and/or brilliance are obtained when the coating is applied to a polymeric film such as Mylar or aluminum.

The so-coated sheet offers good resistance to acids, thereby reducing, if not eliminating, degradation of the cellulose fibers.

Too, paper encased in the polyurea coating markedly reduces the factor of dimensional change.

Further, the coating is solvent resistant wherefore it is possible to wash off a painting and yet not attack the base or substrate.

The foregoing illustrates the broad principles of the invention and it will be understood that modifications and variations may be incorporated therein within the broad spirit of the invention and the broad scope of the claims.

I claim:

1. A substrate for artists' paints or color preparations incorporating upon a surface thereof a coating of a polyurea polymer coating formed from a composition having a formulation within the percentage range of

| | |
|---|---|
| Aliphatic amine (45% solids) | 27.0–40.0 |
| Copolymer of vinyl toluene and methyl styrene (50% solids) | 3.0–17.6 |
| Diatomaceous silica | 15.0–44.0 |
| Titanium dioxide | 2.3–6.6 |
| Long chain aliphatic polyisocyanate (65% solids) | 27.0–40.0 |

2. A coating composition for use on a substrate for artists' paints or color preparations having a formulation within the percentage range of:

| | |
|---|---|
| Polyfunctional aliphatic amine (45% solids) | 27.0–40.0 |
| Copolymer of vinyl toluene and methyl styrene (50% solids) | 3.0–17.6 |
| Diatomaceous silica | 15.0–44.0 |
| Titanium dioxide | 2.3–6.6 |
| 36-C dimeracid based diisocyanate (65% solids) | 27.0–40.0 |

References Cited

UNITED STATES PATENTS 3,493,543   2/1970   Nazy et al. _____ 117—161 KP

FOREIGN PATENTS 1,023,390   3/1966   Great Britain.

WILLIAM D. MARTIN, Primary Examiner

D. COHEN, Assistant Examiner

U.S. Cl. X.R.

260—41 B, 859 R; 117—132 A, 138.8 F, 155 R, 161 KP